July 7, 1964  H. L. BOCHMAN, JR  3,139,787
FASTENER ASSEMBLED BY FLUID FORCES
Filed Aug. 16, 1962
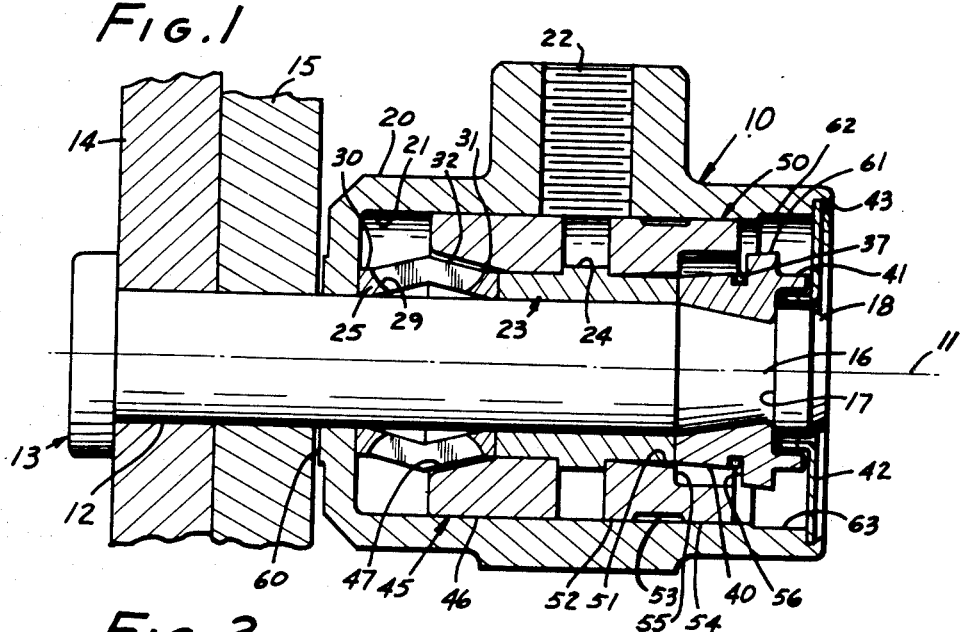
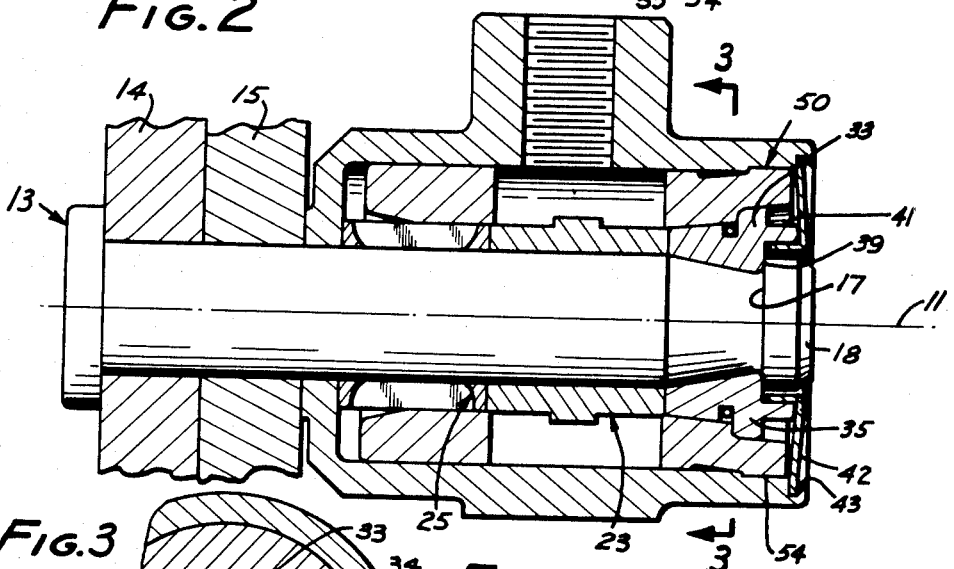
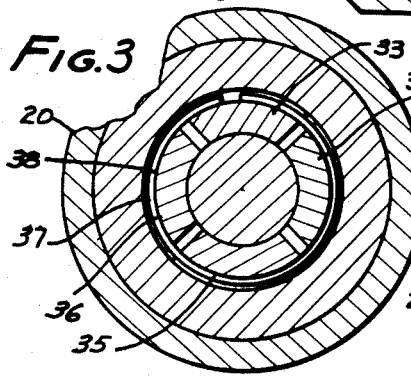
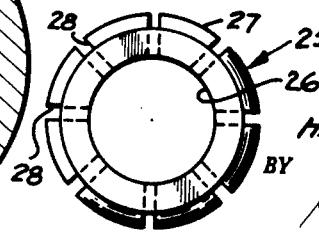
INVENTOR.
HARRY L. BOCHMAN JR.
BY Angus & Mon
ATTORNEYS.

United States Patent Office 3,139,787
Patented July 7, 1964

3,139,787
FASTENER ASSEMBLED BY FLUID FORCES
Harry L. Bochman, Jr., Seal Beach, Calif., assignor to Hi-Shear Corporation, Torrance, Calif., a corporation of California
Filed Aug. 16, 1962, Ser. No. 217,335
16 Claims. (Cl. 85—7)

This invention relates to a fastener adapted to be set by a fluid force.

Fasteners which derive their gripping power from threads, swaging, upsetting, and other conventional techniques are well known. Each of these techniques involves certain known advantages and disadvantages, such as strength attainable, need for access to set the fastener, and others.

It is an object of this invention to introduce an entirely new technique for setting a fastener which has a new range of advantages. For example, it can be set from a remote connection and the strength it develops need have no relationship to effort expended by the person causing the setting operation to occur. This fastener is adapted to make a tight, drawn-up fit with a desired amount of axial tensile preload in a shank, which are derived from a fluid force such as gases generated by an explosive cartridge. Such a device can be slipped loosely over a shank and then actuated to set the fastener on the shank, and provide in that one very rapid operation a fastener of well defined characteristics.

A fastener according to this invention includes a body having an internal cylinder that has an axis coincident with the axis of the shank to which it is to be attached. Within the cylinder, there are disposed a compression sleeve and, on opposite sides thereof, a stretch sleeve and a plurality of locking segments. The segments have the property of bearing against a shoulder in the shank, while the stretch sleeve has the property of being deformable so as to elongate itself and abut both the body and the compression sleeve, thereby pressing against the segments and the body to firmly set up the fastener.

Within the body and making a piston movement with the walls of the cylinder, there are two sleeves, a swaging sleeve and a locking sleeve. The purpose of the locking sleeve is to back up the segments to hold them in the detent, and the purpose of the swaging sleeve is to elongate the stretch sleeve so as to carry out the aforesaid assembling operation.

The fluid pressure to carry out the actuation is introduced between the swaging and the locking sleeves so as to force them apart to carry out the aforesaid functions.

The above and other features of this invention will be fully understood from the following detailed description and the accompanying drawings in which:

FIG. 1 is a side elevation partly in cutaway cross-section showing the fastener in its unset condition;

FIG. 2 is a side elevation partly in cutaway cross-section showing the fastener in its set condition;

FIG. 3 is a cross-section taken at line 3—3 of FIG. 2; and

FIG. 4 is an end view of a portion of FIG. 1.

The presently preferred embodiment of a fastener 10 according to the invention is shown in FIG. 1. The device has a central axis 11. Its purpose is to seize upon and to set up a firm gripping joint with the shank 12 of a bolt 13. The bolt may, for example, hold a pair of objects 14, 15 together. It will readily be understood that a bolt is but a single example of a type of shanked device with which the fastener can be utilized. It might, for example, be a stud instead. In every case, however, the shanked device will be constrained by some means to one of the objects against which the fastener is to bear. In the illustrated example, it is constrained by the head on the shank.

The shank includes a detent 16, which in this case is a peripheral groove, having a shoulder 17 facing toward the object against which the fastener is to bear. Preferably, but not necessarily, a conical nose section 18 is provided on the end of the shank to facilitate the insertion of the shank into the fastener.

The fastener includes a body 20 having an internal cylinder 21 whose axis is coincident with central axis 11, this axis also being that of the shank. A port 22 passes through the sidewall of the body and enters the cylinder at an intermediate region thereof. The cylinder is smooth-walled so as to permit relative piston-type movement of components of the fastener yet to be described.

Within the cylinder, and snugly fitting around the shank, is a central compression sleeve 23 which includes an outer perihperal collar 24 at a central region thereof. This collar provides for a spacing apart of a pair of sleeves yet to be described.

To the left of the compression sleeve in FIG. 1 is a stretch sleeve 25 shown in full detail in FIGS. 1 and 4. The stretch sleeve has a central passage 26, which in the unset condition just passes the shank. The central passage has a relieved central portion that forms a peak 27 on the inside and outside of the stretch sleeve at its center. The peripheral surface is formed into fins 28 by saw cuts 29, the fins being supported and interconnected by ring-like ends 30, 31. At least the right hand outermost surface 32 of the stretch sleeve in FIG. 1 is sloped relative to the central axis to provide a ramp-like surface.

Four segments 33, 34, 35, 36 are also enclosed within the body and are held assembled in ring-like formation by a snap spring 37, which surrounds them and fits in grooves 38 on their outer periphery. The inside surface of each segment includes shoulder 39 adapted to abut shoulder 17 on the shank, and a guide surface 40. The guide surface enables the nose section 18 to displace the segments outwardly as the nose end of the shank is passed through them. A retainer flange 41 is formed on each segment. All of these flanges are engaged by a disc-shaped retainer 42 that is held in place by a staked-over edge 43 of the body. The retainer together with snap spring 37 will hold the internal elements of the fastener from falling out before the fastener is slipped over the shank.

Surrounding the left hand portion of the compression sleeve and the right hand portion of the stretch sleeve is a swaging sleeve 45. This swaging sleeve has an outer cylindrical surface 46 which makes a fluid sealing sliding fit with the inside wall of cylinder 21. It has a cam surface 47 whose pitch matches surface 32. The right hand end of the swaging sleeve is backed up by collar 24 in the unset condition.

A locking sleeve 50 surrounds the right hand portion of the compression sleeve. It includes an inner locking surface 51 whose pitch in the set condition matches that of the nearer outer surface of the segments. The locking sleeve also has an outer cylindrical surface 52 which makes a fluid sealing sliding fit with the wall of cylinder 21. A peripheral relief groove 53 near the middle of the locking sleeve leaves a locking collar 54 at the right hand end of the sleeve. An abutment shoulder 55 is formed on the inner surface of the locking sleeve adapted to strike a matching abutment shoulder 56 on the segments.

The operation of this device will now be described. The initial installation step is shown in FIG. 1 where the objects to be clamped together have the shank of the bolt or like object passed therethrough. Next, the fastener with all of its elements loosely assembled, is slipped over the free end of the shank. As can be seen in FIG. 1, there is clearance 60 between the nearest object and the fastener, so that the fastener is readily slipped onto the shank. The shank can readily pass through the fastener, this movement being facilitated by the tapered nose.

As soon as the guide surfaces 40 of the segments pass beyond shoulder 17 of the detent, they snap into the detent and the fastener cannot then be removed from the shank without removing the retainer. At this time, a gas-releasing cartridge (not shown), which may be either a gas-holding cartridge, or an explosive gas-generating charge, and which may be threaded into port 22, can be actuated or detonated to discharge fluid under pressure into the region between the swaging and locking sleeves. This tends to move the sleeves apart. The same effect may be obtained by exerting hydraulic or pneumatic pressure from other types of sources into the region between the swaging and locking sleeves.

The effect of moving the swaging sleeve to the left is for its cam surface to climb surface 32, and tend to flatten out the stretch sleeve by pressing the stretch sleeve toward the shank. The clearance between the fins permits this motion to occur. The effect of flattening out the stretch sleeve is to press the left hand end of the body to the left, and to press the compression sleeve toward the right against the segments. The segments make a firm abutment between shoulder 17 of the shank detent and their shoulders 39. There is thus developed a direct force reaction between the shank and the body of the fastener, tending to tighten down the fastener and axially, tensilely, preload the shank.

Simultaneously, the fluid force will move the locking sleeve toward the right in FIG. 1. The initial effect is for the internal cam surface 51 to move over the segments to hold them down. When the inner right hand end of the locking sleeve strikes outer cam surface 61 of the segments, the right hand end of the locking sleeve is pressed outwardly so that its locking collar moves over a shoulder 62 formed by a counterbore 63 in the end of the cylinder. Also at this time, shoulders 55 and 56 abut, and the locking sleeve is thereby firmly held against motion in either direction by the body and by the segments.

The retainer has been deformed somewhat by the stretching action of the internal elements, the length of the body having remained essentially unchanged.

In the condition shown in FIG. 2, which follows the aforesaid assembling operation, the body is firmly locked upon the shank and serves the same function as swaged-on collars like the well-known Hi-Shear type, except, of course, that in setting the fastener, compressive forces were not exerted on the shank, but instead, more useful tensile forces were developed. This device has the advantage that it can be assembled in hard-to-reach places simply by detonating a charge placed in port 22, or otherwise exerting pressure therein.

The materials of construction are not particularly critical. Stainless steel of various types is often found desirable for many installations. The compression sleeve must obviously be of dimensions suitable to withstand the compressive forces exerted on it, and the swaging and locking sleeves must be strong enough to carry out their intended functions. The stretch sleeve must be sufficiently flexible that it can be flattened out as shown while still exerting sufficient force at both of its ends to apply the required forces.

This invention is not to be limited by the embodiment shown in the drawings and described in the description which is given by way of example and not of limitation, but only in accordance with the scope of the appended claims.

I claim:

1. A fastener adapted to be assembled to a shank having a shoulder, in order to exert a force between said shoulder and an object to which the shank is restrained, said fastener comprising: a body having an internal cylinder; a compression sleeve; a stretch sleeve, a segment adapted to engage the shoulder on the shank, the compression sleeve being disposed between the stretch sleeve and the segment, the compression sleeve and stretch sleeve both having an inner opening to pass the shank, the stretch sleeve having an inner relief adapted to be reduced by external swaging forces to axially elongate the stretch sleeve; a swaging sleeve, and a locking sleeve, a cylindrical outer surface on each making a sliding fluid sealing fit with the cylinder, and an inner opening in each, the wall of which makes a sliding fluid sealing fit with the compression sleeve; whereby exertion of fluid pressure within the cylinder between the swaging and locking sleeves forces the swaging sleeve over and upon the stretch sleeve, thereby exerting the aforesaid swaging forces, and forces the locking sleeve over and upon the segment, whereby the stretch sleeve is elongated and bears against the body and against the compression sleeve, and through the latter upon the segment and the shank shoulder, the said elongation of the stretch sleeve thereby axially tensioning the shank, and the locking sleeve holding the segment locked onto the shank.

2. A fastener according to claim 1 in which the stretch sleeve includes radially spaced-apart fins at the relief, and an axially aligned external portion making an angle with the central axis, and in which the swaging sleeve includes an inner surface making an angle with the central axis adapted to engage the said external portion to swage it inwardly.

3. A fastener according to claim 1 in which a plurality of segments are included in a ring-shaped array, and in which a retainer spring surrounds and holds the same in said array.

4. A fastener according to claim 3 in which a retainer is held to the body, and which retainer engages a portion of each of said segments to hold them in the body.

5. A fastener according to claim 4 in which the locking sleeve is provided with an external shoulder, and the body is provided with an internal shoulder, said shoulders being engaged when the locking sleeve fits over the segments.

6. A fastener assembly comprising: a shank having a shoulder; and a fastener comprising a body having an internal cylinder, a compression sleeve, a stretch sleeve, a segment adapted to engage the shoulder on the shank, the compression sleeve being disposed between the stretch sleeve and the segment, the compression sleeve and stretch sleeve both having an inner opening to pass the shank, the stretch sleeve having an inner relief adapted to be reduced by external swaging forces to axially elongate the stretch sleeve, a swaging sleeve, and a locking sleeve, a cylindrical outer surface on each making a sliding fluid sealing fit with the cylinder, and an inner opening in each, the wall of which makes a sliding fluid sealing fit with the compression sleeve, whereby exertion of fluid pressure within the cylinder between the swaging and locking sleeves forces the swaging sleeve over and upon the stretch sleeve, thereby exerting the aforesaid swaging forces, and forces the locking sleeve over and upon the segment, whereby the stretch sleeve is elongated and bears against the body and against the compression sleeve, and through the latter upon the segment and the shank shoulder, the said elongation of the stretch sleeve thereby axially tensioning the shank, and the locking sleeve holding the segment locked onto the shank.

7. A fastener assembly according to claim 6 in which the stretch sleeve includes radially spaced-apart fins at the relief, and an axially aligned external portion making an angle with the central axis, and in which the swaging sleeve includes an inner surface making an angle with the central axis adapted to engage the said external portion to swage it inwardly.

8. A fastener assembly according to claim 6 in which a plurality of segments are included in a ring-shaped array, and in which a retainer spring surrounds and holds the same in said array.

9. A fastener assembly according to claim 6 in which a retainer is held to the body, and which retainer engages a portion of each of said segments to hold them in the body.

10. A fastener assembly according to claim 6 in which the locking sleeve is provided with an external shoulder, and the body is provided with an internal shoulder, said shoulders being engaged when the locking sleeve fits over the segments.

11. A fastener adapted to be assembled to a shank having a shoulder, in order to exert a force between said shoulder and an object to which the shank is restrained, said fastener comprising: a body having an internal cylinder; a compression sleeve; a stretch sleeve; a segment adapted to engage the shoulder on the shank, the compression sleeve being disposed between the stretch sleeve and the segment, the compression sleeve and stretch sleeve both having an inner opening to pass the shank, the stretch sleeve having an inner relief adapted to be reduced by external swaging forces to axially elongate the stretch sleeve; a swaging sleeve, and a locking sleeve, a cylindrical outer surface on each making a sliding fluid sealing fit with the cylinder, and an inner opening in each, the wall of which makes a sliding fluid sealing fit with the compression sleeve, the cylinder having a port opening between the swaging and locking sleeves; and fluid pressure means in said port adapted to be actuated to introduce fluid under pressure therein, whereby exertion of fluid pressure within the cylinder between the swaging and locking sleeves forces the swaging sleeve over and upon the stretch sleeve, thereby exerting the aforesaid swaging forces, and forces the locking sleeve over and upon the segment, whereby the stretch sleeve is elongated and bears against the body and against the compression sleeve, and through the latter upon the segment and the shank shoulder, the said elongation of the stretch sleeve thereby axially tensioning the shank, and the locking sleeve holding the segment locking onto the shank.

12. A fastener according to claim 11 in which said fluid-pressure means is a gas-generating detonatable cartridge.

13. A fastener according to claim 11 in which said fluid-pressure means comprises a source of fluid under pressure.

14. A fastener according to claim 11 in which a plurality of segments are included in a ring-shaped array, and in which a retainer spring surrounds and holds the same in said array.

15. A fastener according to claim 14 in which the shank is formed on a stud.

16. A fastener according to claim 14 in which the shank is formed on a headed bolt.

References Cited in the file of this patent

UNITED STATES PATENTS

| | | |
|---|---|---|
| 1,320,225 | Hallett | Oct. 28, 1919 |
| 1,629,925 | Moore | May 24, 1927 |
| 1,849,604 | Weatherhead | Mar. 15, 1932 |
| 1,913,408 | Paul | June 13, 1933 |